(12) United States Patent
Randazzo et al.

(10) Patent No.: US 6,213,422 B1
(45) Date of Patent: *Apr. 10, 2001

(54) METHOD AND SYSTEM FOR HANDLING WIRE BREAKAGE AND OVERFLOW IN A MULTIPLE DYNAMO-ELECTRIC MACHINE PART WINDER

(75) Inventors: Antonio Randazzo, Venice; Rossano Galassi, Florence; Maurizio Mugelli, San Gimignano, all of (IT)

(73) Assignee: Axis USA, Inc., Tampa, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,410

(22) Filed: Jul. 7, 1998

Related U.S. Application Data (60) Provisional application No. 60/052,667, filed on Jul. 16, 1997.

(51) Int. Cl.$^7$ .................................................. H02K 15/09
(52) U.S. Cl. ..................... 242/433.3; 242/439.4
(58) Field of Search ............................... 242/433.4, 433.3, 242/433, 439.4, 443.1, 473.6, 473.8

(56) References Cited

U.S. PATENT DOCUMENTS

| | | |
|---|---|---|
| 4,087,054 | 5/1978 | Finegold . |
| 4,775,271 | 10/1988 | Maccaferri ............................ 414/225 |
| 4,817,256 | 4/1989 | Riti et al. .............................. 29/33 L |
| 5,145,052 | 9/1992 | Santandrea et al. ............. 198/468.2 |
| 5,253,912 | 10/1993 | Andorlini et al. ................. 294/119.1 |
| 5,257,689 | 11/1993 | Lombardi et al. ................. 198/468.2 |
| 5,372,319 | 12/1994 | Dolgas . |
| 5,653,014 | 8/1997 | Faraoni et al. ........................ 29/732 |
| 5,799,896 | 9/1998 | Luciani et al. .................... 242/433.4 |

FOREIGN PATENT DOCUMENTS 234 726 A1  4/1986 (DE) .............................. G01R/31/02

OTHER PUBLICATIONS

"The Aumann Production Line AFS for Manufacturing Armatures for Universal Motors", Willy Aumann KG, Espelkamp, Germany, 1987.

"The Aumann Production–Systems; Armature Winding Machines AEW, ADW", Willy Aumann KG, Espelkamp, Germany, 1988.

Patent Abstracts of Japan Publication No. 01081646, (odawara Eng. K.K.), Mar. 27, 1989.

*Primary Examiner*—Katherine A. Matecki
(74) *Attorney, Agent, or Firm*—Fish & Neave; Robert R. Jackson; Brajesh Mohan

(57) ABSTRACT

Methods and system for allowing the winder to continue to wind armatures and therefore avoid a total loss of production which would otherwise occur during the time which passes between breakage or overflow of the wire and intervention of the operator to restore normal winding conditions are provided. Upon detection of a wire breakage or overflow at a winding position, the wires from flyers corresponding to that position are withdrawn by a withdrawing device. In addition to withdrawing the wires from flyers corresponding to the position where the wire breakage or overflow took place, all flyer rotations in the multiple dynamo-electric part winder are stopped. The affected armatures are transferred to a reject track and new armatures to be wound are subsequently delivered to the winding positions. While the armature in the position where the breakage or overflow was detected remains unwound, the armature in the other position is wound and delivered to the conveyor. The transfer device sends back and forth two unwound armatures to the position where the breakage or overflow was detected, while only wound armatures from the unaffected positions are delivered to the conveyor.

18 Claims, 5 Drawing Sheets

METHOD AND SYSTEM FOR HANDLING WIRE BREAKAGE AND OVERFLOW IN A MULTIPLE DYNAMO-ELECTRIC MACHINE PART WINDER

CROSS REFERENCE TO RELATED PATENT APPLICATION

This claims the benefit of, commonly-assigned U.S. Provisional Patent Application Ser. No. 60/052,667, filed Jul. 16, 1997, now abandoned.

BACKGROUND OF THE INVENTION

The present invention relates to operations of a multiple dynamo-electric machine part winder of the type described in copending, commonly-assigned U.S. patent application Ser. No. 08/695,835, filed Aug. 7, 1996, now U.S. Pat. No. 5,799,896, which is hereby incorporated by reference in its entirety, which describes the simultaneous wounding of multiple armatures. In particular, this invention relates to handling wire breakage and overflow in a multiple dynamo-electric machine part winder.

There is always an interest in achieving high rates of productivity in a manufacturing line. In a manufacturing line for dynamo-electric machine parts it is customary for parts to travel along a conveyor, alongside of which are disposed various workstations for further processing. In order to increase productivity it is important to minimize the time these workstations have to wait for parts. Accordingly, it is important that the manufacturing line is not completely stalled due to wire breakage or overflow resulting from wire being wound out of the core slots at a multiple armature winder, and for it to be simpler and faster to restore a multiple armature winder to full operation after such a breakage or overflow.

Production time is lost when a wire breaks and successive rotations of the corresponding flyer causes extra wire to be dispensed in an uncontrolled manner. This uncontrolled delivery of wire results in undesired wire waste as well as potential jamming, each requiring time consuming and laborious operator intervention to restore the winder to normal operating conditions.

Similarly, an overflow caused by wire wound out of the slots can impede proper operation of the winder. When wire has been wound on the external surface of the laminations, as occurs in the case of an overflow, rotation of the armature around its longitudinal axis in order to position its slots in relation to the winding guides to receive the wire can result in jamming of the common motor which is causing the rotational movement.

Typically, in the event of such an occurrence—e.g., wire breakage or overflow—the entire machine is stopped until an operator intervenes to restore the feed of the broken wire in the flyer which was dispensing it, resulting in stalling the production line.

It would be desirable to be able to provide a method and system for allowing the winder to continue to wind armatures and therefore avoid a total loss of production which would otherwise occur during the time which passes between breakage or overflow of the wire and intervention of an operator to restore normal winding conditions.

It would also be desirable to be able to provide a method and system for maintaining the winder in a way which will allow the operator to easily restore normal winding conditions after a wire breakage or an overflow has occurred.

SUMMARY OF THE INVENTION

It is an object of this invention to provide a method and system for allowing the winder to continue to wind armatures and therefore avoid a total loss of production which would otherwise occur during the time which passes between breakage or overflow of the wire and intervention of an operator to restore normal winding conditions.

It is also an object of this invention to provide a method and system for maintaining the winder in a way which will allow the operator to easily restore normal winding conditions after a wire breakage or an overflow has occurred.

In accordance with the invention, a method and system are provided for handling incorrect feeding of wire (e.g., wire breakage, overflow, or the like) in a multiple dynamo-electric part winder in order to increase its productivity. In particular, the principles of this invention are useful for multiple armature winders which have, for example, rotation of two flyers on a same side of the multiple armature winder driven by a common motor. In such an arrangement, flyers driven by a common motor on one side of the multiple armature winder wind one-half of the coils of a corresponding armature which it is winding, while flyers on the other side driven by another common motor wind the other half of the corresponding armature which it is winding. By means of this invention, a wire breakage or overflow detected in any of the flyers is managed so as not to stall the production line.

According to the principles of this invention, upon detection of a wire breakage or an overflow in one of the flyers at a winding position, the wires from all flyers corresponding to that position are withdrawn by a withdrawing device. Such a withdrawing device is shown in previously referred to patent application. In addition to withdrawing the wires from flyers corresponding to the position where the wire breakage took place, all flyer rotations in the multiple dynamo-electric part winder are stopped.

The withdrawing device withdraws the wires from flyers in the position where the wire breakage took place in order to prevent the wires from being further dispensed by centrifugal force caused by rotation of the flyers. Withdrawing the wire causes the wire still threaded through the flyer opposite to the flyer where the breakage took place to tear, resulting in both flyers in the position where the breakage or overflow was detected in having no wire threaded through them.

Moreover, because all flyer rotations in the multiple armature winder are stopped upon detection of a breakage or an overflow, the armature in the unaffected position—i.e., the position where the breakage or overflow did not occur—may be in a partially wound state when its respective flyers are stopped. The lead grippers, cutters, and flyers of the unaffected position operate to grasp and cut the wires leading to their respective flyers in order to terminate and free the corresponding armature.

The armatures from both positions are then unloaded by a transfer device—e.g., like the one shown in the patent application cited above—and placed in a reject track. The transfer device transports armature cores that need to be wound from the conveyor to respective positions of the multiple armature winder, and also transfers cores that have been wound from the winder to the conveyor. Thereafter, a first batch of unwound armatures is delivered by the transfer device to respective positions of the multiple armature winder.

Because flyers corresponding to the position where the wire breakage or overflow was detected are un-threaded (because of the withdrawing action), only the armature delivered to the unaffected position—i.e., the position with no wire breakage or overflow—is wound. Upon completion of the winding process of the first batch of armatures, both armatures are transferred to respective grippers of the transfer device and a second batch of armatures is delivered to the winder for winding.

While the gripper holding the wound armature, received from the position with no wire breakage or overflow, deposits the wound armature on the conveyor, the gripper holding the unwound armature, received from the position where the wire breakage or overflow was detected, holds on to the unwound armature and does not deposit the armature on the conveyor. Thus, only one gripper—i.e., the one that deposited the wound armature on the conveyor—receives a new unwound armature from the conveyor.

After completing the winding process on the second batch of armatures received in the preceding step, the armatures (one wound and one unwound) are transferred by the transfer device which deposits the wound armature on the conveyor and retains the unwound armature received from the winder position with the wire breakage or overflow. In addition, the unwound armature corresponding to the first batch that was retained in the preceding step by one of the grippers of the transfer device is returned to the position where the wire breakage or overflow was detected for the winder to attempt winding the unwound armature again.

The above-described steps are repeated until the position in the winder where the breakage or overflow was initially detected has been rendered operational. Under these conditions, only one armature is being wound by the multiple armature winder and accordingly, only one wound armature is deposited onto the conveyor, and only one unwound armature is received by the gripper from the conveyor for the production cycle that normally resulted in two wound armature being deposited onto the conveyor.

Thus, aside from preventing the production line from stalling, this invention also maintains production, albeit at a slower rate, by transferring wound armatures from the unaffected positions to the conveyor for transportation to other workstations. In addition, all armatures delivered by the transfer mechanism to the conveyor are wound and ready to be processed by other workstations.

The above described feature of this invention is in contrast to merely withdrawing the wire from the position with the breakage or overflow. Merely withdrawing the wire from the position with the breakage or overflow without preventing the affected armatures from being deposited onto the conveyor may cause disruption in the production cycle because, every other armature deposited onto the conveyor would be unwound and thus, not prepared to undergo further processing by workstations disposed alongside the production line. This is in contrast to this invention where only one armature—i.e., the wound armature—is being deposited onto the conveyor.

The present invention avoids the above-described disagreeable result by transferring back and forth two unwound armatures between a gripper position on the transfer device and the position where the breakage or overflow took place in the winder, while other unwound armatures received by the transfer device from the conveyor are being wound by the unaffected winder position and subsequently being delivered back to the conveyor for further processing by workstations disposed alongside the production line.

BRIEF DESCRIPTION OF THE DRAWING

The above and other objects and advantages of the invention will be apparent upon consideration of the following detailed description, taken in conjunction with the accompanying drawing, in which like reference characters refer to like parts throughout, and in which:

FIG. 3 shows elements broken off in FIG. 2, albeit at a different scale and from a different direction.

DETAILED DESCRIPTION OF THE INVENTION

In accordance with the invention, a method and system are provided for handling wire breakage and overflow in a multiple dynamo-electric part winder in order to increase its productivity. In particular, the principles of this invention are useful for multiple armature winders which have rotation of two flyers on a same side of the multiple armature winder driven by a common motor. By means of this invention, a wire breakage or overflow detected in any of the flyers is managed so as not to stall the production line.

Figure 1:
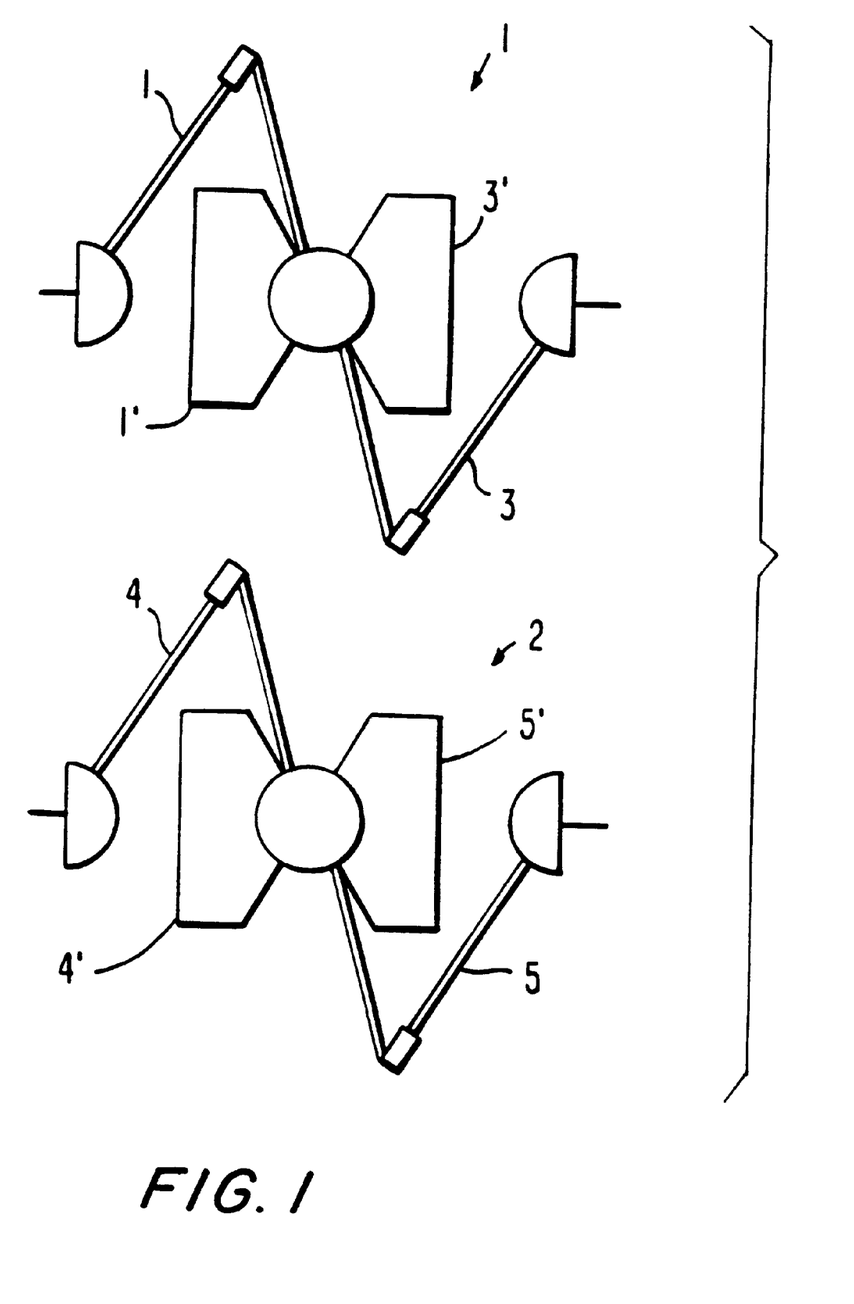
FIG. 1 is a schematic representation of two winding positions in a multiple armature winder with flyers for winding armatures positioned in respective positions constructed according to this invention.

This invention can be further elucidated by considering a wire breakage or an overflow for one of the wires being wound in one of two positions, position 1 or position 2, shown schematically in FIG. 1. For the purpose of this description, a wire breakage or an overflow for one of the wires being wound in position 1 is considered, although the same situation and the operations being described can occur and be applied for a wire being wound on an armature in position 2.

FIG. 1 is a schematic representation of a multiple armature winder with two winding positions, position 1 and position 2, respectively. Also shown in FIG. 1 are flyers 1 and 3 for winding the armature positioned in position 1 by using respective winding guides 1' and 3' and flyers 4 and 5 for winding the armature positioned in position 2 by using respective winding guides 4' and 5'.

Flyers 1 and 4, located on one side of the armatures at their respective positions, are rotated synchronously with respect to each other by a first common motor (not shown) to deliver their wires during winding. Similarly, flyers 3 and 5, located on the other side of the armature at their respective positions, are also rotated synchronously with respect to each other by a second common motor. Furthermore, the armatures are rotated synchronously by a third common motor around their longitudinal axes between winding of coils, in order to position their core slots in relation to their respective winding guides for receiving the wire.

In the event of a breakage of the wire, successive rotation at the winding speed of the flyer whose wire has broken will dispense extra wire in a random way requiring long and laborious operator intervention to restore the winder to normal operating conditions. Thus, the delivery of wire needs to be stopped when a breakage occurs. Similarly, wire delivery from the respective flyer must also be stopped when an overflow occurs. Otherwise, the wire wound out of the slots can impede proper operation of the winder. When wire has been wound on the external surface of the laminations, as occurs in the case of an overflow, a rotation of the armature around its longitudinal axis with this external wiring also can result in jamming of the common motor that causes the rotational movement.

Various devices for detecting breakage of the wire are well known and commonly used in the prior art to command flyer rotation when a wire breakage occurs during winding. Usually these devices detect the breakage by measuring an abnormal oscillation of the dancer arm or a sudden variation of the wire travel due to the wire breakage.

Overflow can be detected by a device which measures the length of the wire being delivered by each flyer. More particularly, an abnormal increase in length of wire being wound indicates that the flyer is causing an overflow. An extra length of wire is consumed during an overflow because the wire is being wound on a longer perimeter.

Figure 2:
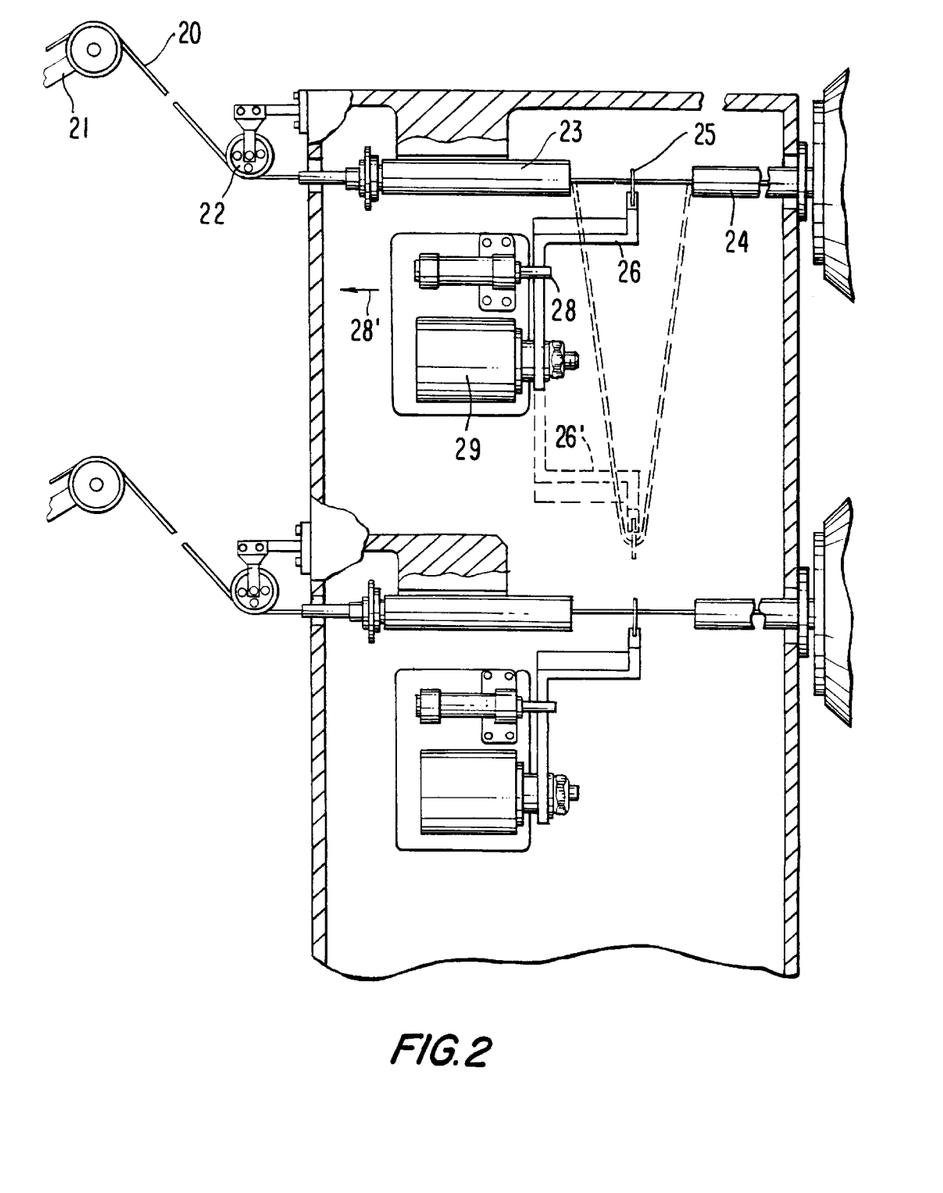
FIG. 2 is a simplified sectional view of an exemplary apparatus that may be used in accordance with the method and system of the present invention.

A breakage of wire or an overflow which has been detected in one of the flyers—e.g., in flyer 1 for the following—will cause the withdrawing device of FIG. 2 to withdraw the wire from flyers 1 and 3 and an immediate stop of all the flyer rotations in the machine—i.e., including flyers associated with position 2—. However, wires corresponding to flyers of the position where no breakage or overflow has been detected undergo traditional cutting and gripping operations.

The withdrawing device of FIG. 2 is the same as that described in the previously referred to patent application, which is hereby incorporated by reference herein. Therefore, its detailed structure and operating principles will be examined only in the aspects which are required to fulfill the description requirements of this invention. However, it will be understood that the method and system of this invention are not limited to this particular withdrawing device, which is merely used for illustration and not as a limitation.

With reference to FIG. 2, wire 20 for winding coils of an armature passes from a dancer arm 21, which is part of a traditional tensioner device. After the dancer arm, the wire travels through wheel 22 which aligns the wire with a horizontal tube 23 through which it passes so that it can reach the rear end of flyer shaft 24. Between the tube and the rear end of the flyer shaft, the wire is threaded through a passing ring 25 which is part of withdrawal arm 26. After the rear end of the flyer shaft, the wire runs through the entire length of the flyer shaft to reach an outwardly extending arm of the flyer (not shown) and then the extreme dispensing pulley (not shown) from which it is dispensed to wind the armature coils. The flyer shaft, together with the extending arm, is rotated to achieve winding by the common motor described previously.

By feeding pressurized air to cylinder 29, withdrawal arm 26 can be rotated for a certain angle to assume the position shown by the phantom representation 26', depending on which side of air cylinder 29 is supplied with air. When breakage of the wire is detected, the related signal causes pin 28 to be retracted in horizontal direction 28' so that it moves out of the way to allow the withdrawal arm to rotate to the position shown by the phantom representation 26'. Representation 26' shows the position reached by the arm at the end of this rotation. During this rotation, wire 20 cannot leave passing ring 25. Therefore, the stretch of wire going to the flyer is drawn rearwardly to prevent further dispensing of the wire.

The portion without numbering in FIG. 2 shows another withdrawal device applied to a lower flyer which is driven by the same motor which rotates flyer shaft 24. Similarly, the flyers on the other side of the multiple armature winder will be provided with withdrawal devices like the one shown in FIG. 2, so that for each wire being wound, breakage can be detected and consequent withdrawal can occur.

Because of the above-described withdrawing operation, the wire of flyer 3, which was not broken previously, will also be severed by the pull of the withdrawing device. This operation will leave the armature in position 1 with a certain length of stray leads while the armature of position 2 will be in a partially wound condition. The lead grippers, the cutters, and flyers of position 2 will then operate to grasp and cut the wires leading to flyers 4 and 5 to terminate and free the armature in this position.

Furthermore, flyers 1 and 3 in position 1, no longer having wire threaded through them, and are free to rotate without hindering the winder or the armature from being unloaded. In position 2, the armature can also be unloaded, and flyers 4 and 5 have their wires extending to the grippers so that winding can be accomplished on a new unwound armature. The armatures in position 1 and 2 are unloaded from the winder by the transfer device shown in FIGS. 3, 4, and 5, and placed in a reject track.

Figure 3:
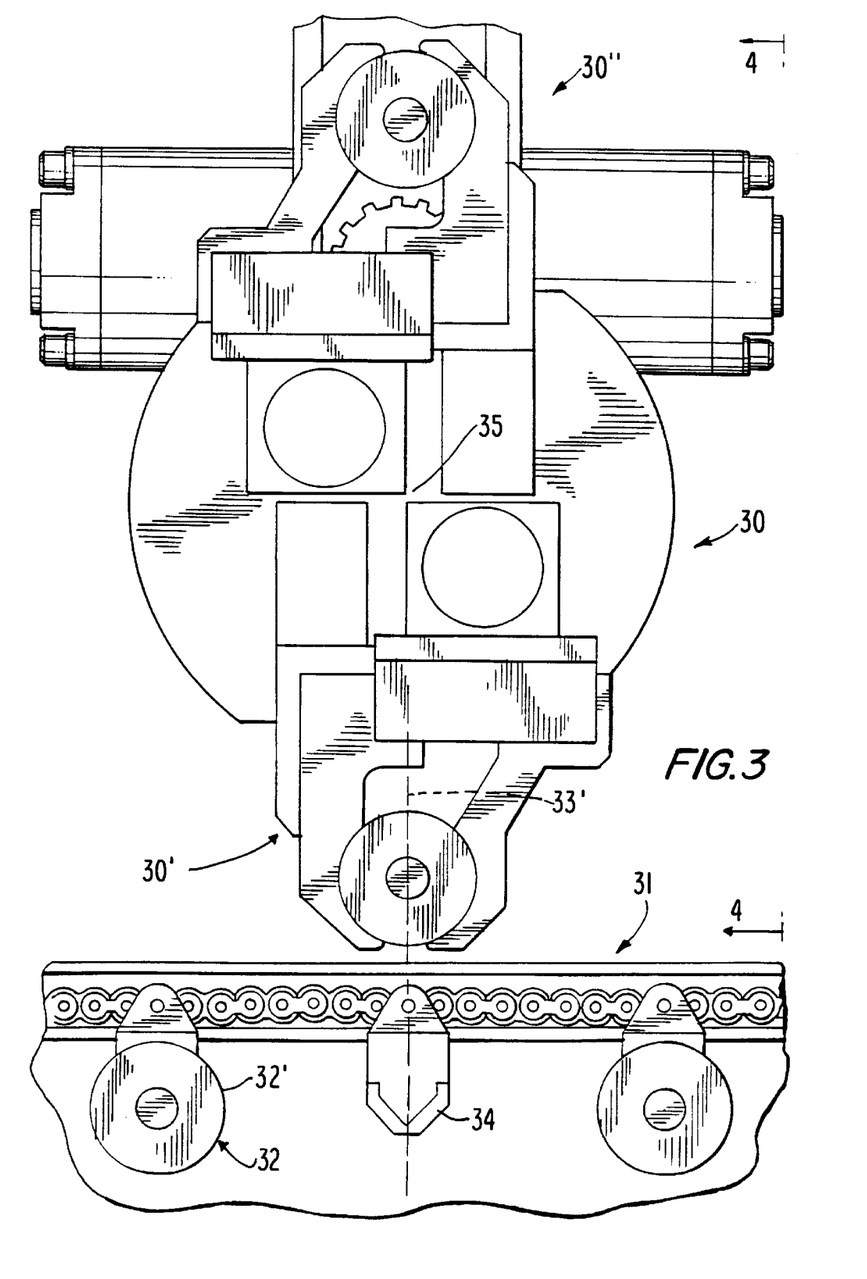
FIG. 3 is a simplified partial elevational view of a portion of an exemplary apparatus that may be used in accordance with the method and system of the present invention, taken along the direction of the longitudinal axis of an armature to be gripped.
Figure 4:
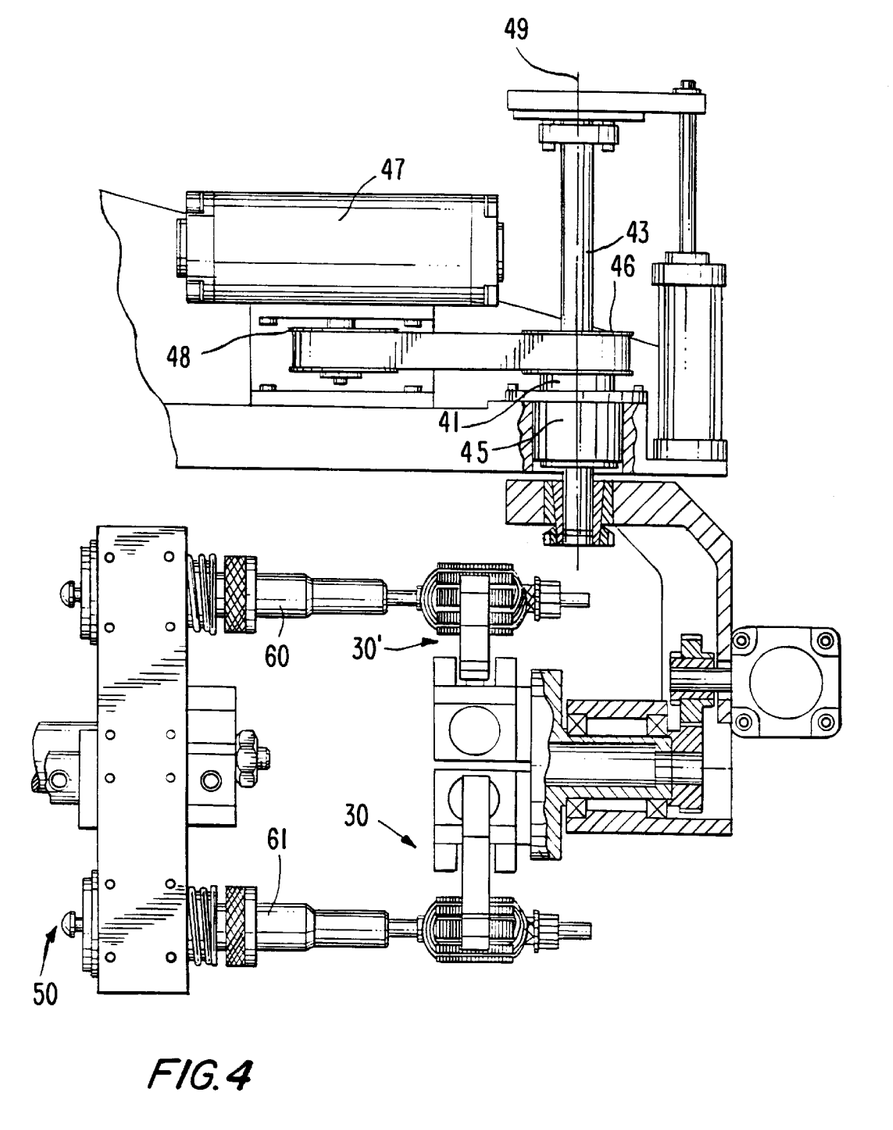
FIG. 4 is an elevational view taken generally along the line 4—4 in FIG. 3 when the holders of the first transfer mechanism are rotated.
Figure 5:
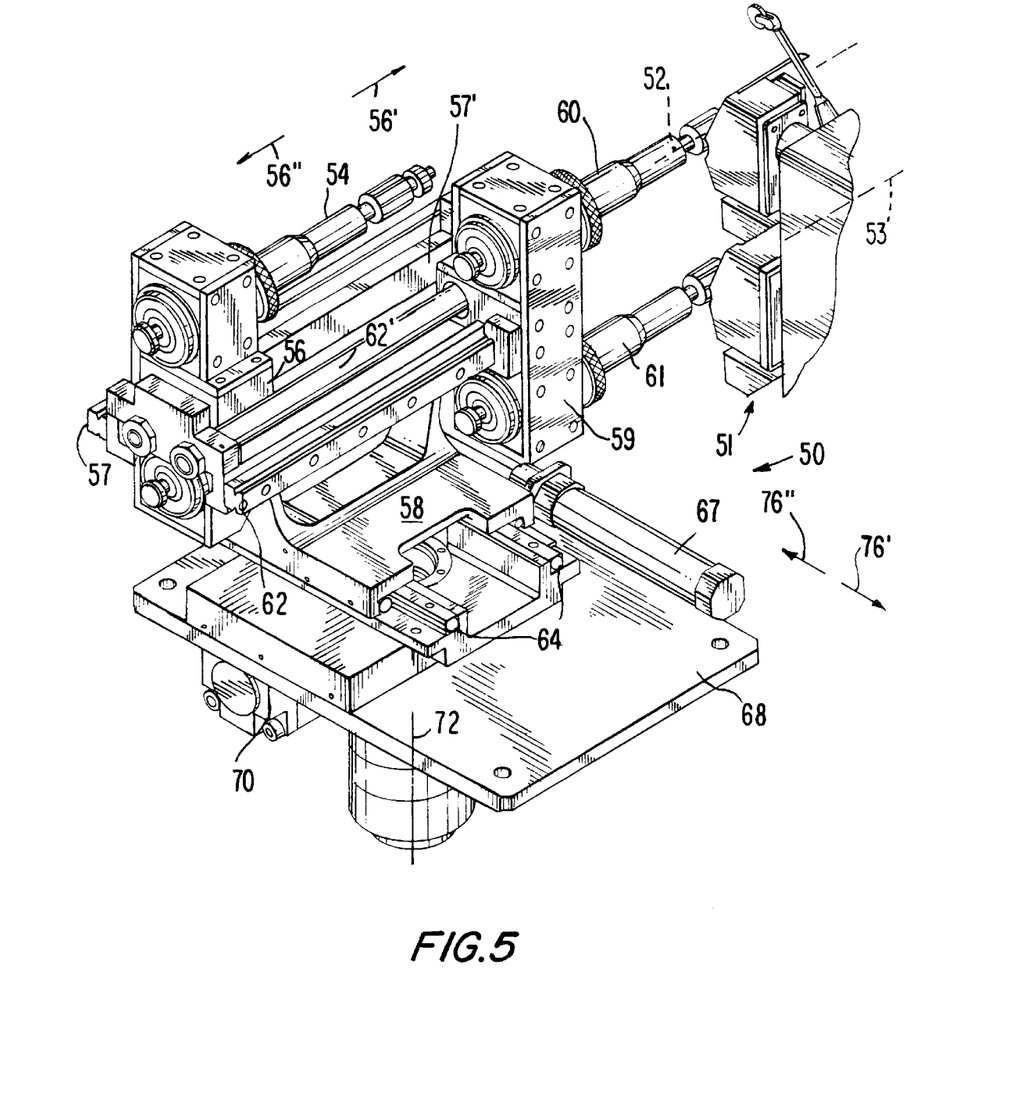
FIG. 5 is an isometric view of a portion of the apparatus shown in FIG. 4 with still more apparatus that may be used in accordance with the methods and system of the present invention.

The transfer device shown in FIGS. 3, 4, and 5 is the same as that described in the previously cited patent application, therefore, its detailed structure and operating principles, too, will be examined only in the aspects which are required to fulfill the description requirements of this invention. However, it will be understood that the method and system of this invention are not limited to this particular transfer device, which is merely used for illustration and not as a limitation.

FIG. 3 is a simplified partial elevational view of a portion of a first sub-unit of the transfer device that may be used in accordance with the principles of the present invention, taken along the direction of the longitudinal axis of an armature to be gripped. FIG. 2 shows sub-unit 30 of the transfer device positioned over a conveyor 31. The conveyor is required for transporting the armature cores—e.g., assembled armature shaft, commutator, and ferromagnetic core—which need to be wound to the multiple armature winder.

Conveyor 31 also transports the armatures wound by the multiple armature winder to a downstream station for further processing—e.g., a fusing operation—. The unwound armature cores 32 to be transferred to the multiple armature winder for winding become centered by the conveyor on vertical axis 33'. (In FIG. 3 an empty seat 34 of the conveyor is shown aligned on axis 33'. This seat is empty because an armature has already been removed for transfer to the multiple armature winder).

Sub-unit 30 is provided with two grippers 30' and 30" for grasping armatures around their core stack 32'. At the single alignment position the parts are removed from the conveyor one at a time and held in grippers 30' and 30" until multiple parts can be supplied to the winder substantially simultaneously. Grippers 30' and 30" are capable of rotating 180° around center axis 35, which causes them to exchange their respective positions on axis 33' over the conveyor.

FIG. 4 is an elevational view taken generally along the line 4—4 in FIG. 3 when the holders of the first transfer mechanism are rotated. As shown in FIG. 4, shaft 43 rotates around axis 49 by having pulley wheel 46 flanged to a sleeve 41 extending from guide unit 45. By means of the belt connection between drive pulley wheel 48 and pulley wheel 46, this rotation by means of air cylinder 47 will cause shaft 43 to rotate around axis 49 for 180°, either in a clockwise or anticlockwise direction, depending on which side of the air cylinder is supplied with air.

FIG. 5 shows in greater detail a second sub-unit 50, which transfers armatures between sub-unit 30 and the multiple armature winder W. The chucks and the flyer assemblies of one side of the multiple armature winder are referenced 51, while those of the other side are not shown. In FIG. 5, the winding axes on which the armatures need to be positioned for winding by the multiple armature winder have been referenced 52 and 53.

Grippers 54 and 55 (gripper 55 remains hidden in FIG. 5), parallel to each other for holding armatures to be wound, are mounted on slide 56, which is able to translate on guide 57 in directions 56' and 56" by means of air cylinder 57'. By translating in direction 56' the slide moves toward a forward end of structure 58. The movement in direction 56' allows grippers 54 and 55 to receive armatures to be wound from grippers 30' and 30" from sub-unit 30 or to deliver the same armatures to collets of the multiple winder positioned on winding axes 52 and 53.

Translation in direction 56" causes the slide to move to a rearward end of central structure 58. This translation is required to take the armatures to be wound away from grippers 30' and 30" of sub-unit 30, or to retract grippers 54 and 55 away from the winder after the armatures to be wound have been delivered to the collets of the winder positioned on winding axes 52 and 53. Similarly, on the other side of the central structure there is a second slide 59 for movement of grippers 60 and 61, which are necessary for holding armatures that have been wound by the multiple armature winder.

Grippers 60 and 61 are mounted on slide 59, which is able to translate on guide 62 in directions 56' and 56" by means of air cylinder 62'. Guide 62 is fixed to one side of support structure 58. By translating in direction 56', slide 59 moves toward a forward end of structure 58. This movement is required to deliver wound armatures held by grippers 60 and 61 to grippers 30' and 30" of sub-unit 30, or to receive in grippers 60 and 61 wound armatures from the collets of the winder positioned on winding axes 52 and 53.

Translation in direction 56" causes slide 59 to move to a rearward end of central structure 58.

This translation is required to retract grippers 60 and 61 away from grippers 30' and 30" after wound armatures have been delivered to the latter, or to remove grippers 60 and 61 from the winder once they are holding wound armatures. Structure 58 can translate between two sideways positions because it is mounted on guides 64 of base 68. Air cylinder 67, connected to structure 45, can be used to cause this translation. Structure 58 can also translate in directions 76' and 76" to align grippers 54 and 55 with the winder axes 52 and 53 and also to align grippers 60 and 61 with grippers 30' and 30" so that the former can move forward to deliver the wound armatures.

Furthermore, by supplying pressurized air alternatively to the two chambers of air cylinder 70, base 68 is rotated around axis 72, either in a clockwise or anticlockwise direction, depending on which chamber is supplied. This causes grippers 54, 55, 60, and 61 to move between a position where the grippers face the multiple winder and a position where they are facing sub-unit 30.

Upon detection of a breakage or overflow in position 1, flyer 1 for our example, the withdrawing device of FIG. 2 withdraws the wires from the flyers in position 1—i.e., flyers 1 and 3—and all flyer rotations in the multiple winder are stopped. The lead grippers, and cutters of position 2 operate to grasp and cut the wires leading to their respective flyers in order to terminate and free the corresponding armature. To reduce the risk of broken or excess wire associated with position 1 becoming jammed between the armature and winding guides 1' and/or 3' at position 1, the termination operation mentioned in the immediately preceding sentence is preferably performed by rotating both armatures by the smallest amount possible to position any commutator hooks, tangs, slots, etc. for use as wire attachment points during the termination operation.

After the above-described operations are performed, grippers 60 and 61 retract the armatures from the winder (by activating air cylinder 62', which moves slide 59 in direction 56"). Once grippers 60 and 61 have retracted the armatures from the winder, structure 58 translates in direction 76' by means of air cylinder 57 to allow the collets of the winders to receive the first batch of new unwound armatures from grippers 54 and 55 after the breakage was detected.

Once grippers 54 and 55 have delivered the first batch of new unwound armatures and retracted from the winder, the winder can start winding again, and base 68 can be rotated by means of air cylinder 70 for 180° around axis 72 to make the grippers face sub-unit 30. However, it should be noted that the armature in position 1 of the winder will not be wound because the wire from the corresponding flyers had been withdrawn in the preceding step upon detection of a breakage. Thus, only the armature present in position 2 is being wound by the winder in this example. Although it will not be wound, an armature is preferably supplied to position 1 to stabilize winding guides 1' and 3' and prevent them from interfering with the tooling which is provided for shielding the commutator.

The armatures held by grippers 60 and 61 are thereafter delivered to grippers 30' and 30" of sub-unit 30 to be deposited in a reject track. After the winding operation on the first batch of armatures delivered by grippers 54 and 55 is completed, the first batch of armatures (one unwound and one wound) is retracted from the winder by grippers 60 and 61 and a second batch of new unwound armatures is delivered to the winder by grippers 54 and 55.

The armatures held by grippers 60 and 61 are delivered to grippers 30' and 30" of sub-unit 30. The gripper of sub-unit 30 corresponding to the unaffected position—i.e., position 2—delivers the wound armature to conveyor 31 (FIG. 3) and picks up another new unwound armature for winding from conveyor 31 (FIG. 3). On the other hand, the gripper of sub-unit 30 corresponding to the position where the breakage was detected—i.e., position 1—does not deposit the unwound armature, but rather holds on to it. In a subsequent step, the retained unwound armature and the newly picked unwound armature are transferred to grippers 54 and 55, respectively.

When the winding operation on the second batch of armatures previously delivered by grippers 54 and 55 after to the winder is completed, the second batch of armatures (one unwound and one wound) is retracted from the winder by grippers 60 and 61, following which a third batch of armatures—comprising the retained unwound armature from the first batch and the newly picked unwound armature—is delivered to the winder by grippers 54 and 55. The second batch of armatures (one unwound and one wound) is thereafter delivered to grippers 30' and 30" of sub-unit 30.

Again, the gripper of sub-unit 30 corresponding to the position where the breakage was detected—i.e., position 1—retains the unwound armature while the gripper of sub-unit 30 corresponding to the position where there was no breakage—i.e., position 2—deposits the wound armature onto conveyor 31 (FIG. 3) and picks up another new unwound armature for winding.

Until the operator intervenes to restore the winder to normal winding conditions, the above described operation is repeated to supply both positions 1 and 2 of the winder with unwound armatures, even if this results only in winding of armatures which are positioned in position 2. However, as described above, during these operations two unwound armatures are transferred back and forth between the position where the breakage or the overflow has occurred—i.e., position 1 in the example—and a gripper of the transfer device.

As described before, the principles of the present invention provide for a method and system for controlling wire breakage and overflow and subsequently only depositing successfully wound armatures onto the conveyor. This is especially beneficial in that only wound armatures are transported to a downstream station for further processing—e.g., a fusing operation—.

The above is made possible by transferring back and forth two unwound armatures between a gripper position on a transfer device and the position where the breakage or overflow was detected, while other unwound armatures received by the transfer device from a transportation device—e.g., a conveyor—are being wound by the unaffected winder position and subsequently being delivered back to the conveyor for further processing to a downstream station.

In an alternative embodiment, rotation of the armatures around their longitudinal axes may be accomplished by independent motors. Therefore, the motor controlling rotation of the armature in the position where the breakage or the overflow has occurred can be turned off until normal operations are restored. This avoids rotating the armature between the winding guides when the wire has been broken or where there has been an overflow. Thus, the affected armature can remain in the winder during successive winding and only one armature needs to be transferred by the transfer device.

In another alternative embodiment, each flyer has an independent motor. Thus, all motors corresponding to one of the positions (either 1 or 2) where the wire breakage or the overflow has occurred can be stopped and kept stationary during successive winding of armatures in the other position. In this embodiment, the withdrawing devices for withdrawing the wire from the flyers are no longer required.

Although the principles of this invention have been illustrated in the context of a multiple armature winder having two winding positions, it will be understood that the principles of this invention are equally applicable to a multiple armature winder having multiple winding positions and associated transfer mechanisms.

Thus it is seen that a method and system for allowing the winder to continue to wind armatures and therefore avoid a total loss of production which would otherwise occur during the time which passes between breakage or overflow of the wire and the intervention of the operator to restore normal winding conditions has been provided. The foregoing is merely illustrative of the principles of this invention and various modifications can be made by those skilled in the art without departing from the scope and spirit of the invention. For example, One skilled in the art will appreciate that the present invention can be practiced by other than the described embodiments, which are presented for purposes of illustration and not of limitation, and the present invention is limited only by the claims which follow.

What is claimed is:

1. A system for operating a machine for simultaneously winding a plurality of coils of wire on a plurality of dynamo-electric machine armature cores in respective winding positions, said system comprising:

a monitoring device for monitoring said wire for incorrect feeding;

a controlling device that upon detection of incorrect feeding of said wire in one of said winding positions, controls said wire to prevent further dispensing of said wire in said one of said winding positions corresponding to said incorrect feeding and terminates winding operation at others of said winding positions; and a transfer device for removing all of said cores from said respective winding positions.

2. The system of claim 1 wherein said controlling device withdraws said wire from flyers associated with said one of said winding positions corresponding to said incorrect feeding and stops flyer rotations at others of said winding positions.

3. The system of claim 1 wherein said controlling device cuts and grips wires leading to respective flyers corresponding to others of said winding positions.

4. The system of claim 1 wherein said transfer device delivers a first batch of cores to said respective winding positions for winding and removes each of said first batch of cores from respective winding positions after winding operation is completed, wherein one of said first batch of cores corresponding to said one of said winding positions corresponding to said incorrect feeding remains unwound and said cores of said first batch of cores corresponding to others of said winding positions are wound.

5. The system of claim 1 wherein:

said transfer device retains said one of said first batch of cores of said one of said winding positions corresponding to said incorrect feeding in a gripping device; and places said others of said first batch of cores corresponding to others of said winding positions on a transportation device, followed by picking up of a corresponding number of unwound cores from said transportation device.

6. The system of claim 1 wherein after said transfer device removes said first batch of cores from said respective winding positions, said transfer device transfers a second batch of cores to said respective winding positions.

7. The system of claim 6 wherein said transfer device removes said cores of said second batch from said respective winding positions after winding operation is completed, wherein one of said second batch of cores corresponding to said one of said winding positions corresponding to said incorrect feeding remains unwound and others of said second batch of core of said other winding positions are wound.

8. The system of claim 7 wherein said transfer device, after removing cores of said second batch, delivers a third batch of cores to said respective winding positions, wherein said third batch of cores comprises said one of said first batch of cores that was retained by said transfer device and cores previously picked up by said transfer device.

9. The system of claim 8 wherein said transfer device delivers said one of said first batch of cores previously retained to said one of said winding positions corresponding to said incorrect feeding and said cores previously picked up to said others of said winding positions.

10. A method of operating a machine for simultaneously winding a plurality of coils of wire on a plurality of dynamo-electric machine armature cores in respective winding positions, said method comprising:

monitoring said wire for incorrect feeding;

upon detection of incorrect feeding of said wire in one of said winding positions, controlling said wire to prevent further dispensing of said wire at said one of said winding positions corresponding to said incorrect feeding and terminating winding operation at others of said winding positions; and removing all of said cores from said respective winding positions.

11. The method defined in claim 10 wherein said controlling comprises withdrawing said wire from flyers associated with said one of said winding positions corresponding to said incorrect feeding and stopping flyer rotations at others of said winding positions.

12. The method defined in claim 10 wherein said terminating comprises cutting and gripping wires leading to respective flyers corresponding to others of said winding positions.

13. The method defined in claim 10 further comprising:

delivering a first batch of cores to said respective winding positions for winding; and removing each of said first batch of cores from said respective winding positions after winding operation is completed, wherein one of said first batch of cores corresponding to said one of said winding positions corresponding to said incorrect feeding remains unwound and others of said first batch of cores corresponding to others of said winding positions are wound.

14. The method defined in claim 13 further comprising:

retaining said one of said first batch of cores of said one of said winding positions corresponding to said incorrect feeding in a gripping device; and placing said others of said first batch of cores of others of said winding positions on a transportation device, followed by picking up of a corresponding number of unwound cores from said transportation device.

15. The method defined in claim 13 wherein after said first batch of cores is removed from said respective winding positions, a second batch of cores is transferred to said respective winding positions.

16. The method defined in claim 15 wherein cores of said second batch are removed from said respective winding positions after winding operation is completed, wherein one of said second batch of cores of said one of said winding positions corresponding to said incorrect feeding remains unwound and others of said second batch of cores of said other windings position are wound.

17. The method defined in claim 16 wherein, removal of cores corresponding to said second batch is followed by delivery of a third batch of cores to said respective winding positions, wherein said third batch of cores comprises said one of said first batch of cores from said retaining and cores from said picking up.

18. The method defined in claim 17 wherein, said one of said first batch core from said retaining is delivered to said one of said winding positions corresponding to said incorrect feeding and said cores from said picking up are delivered to others of said winding positions.

* * * * *